Figure 1:
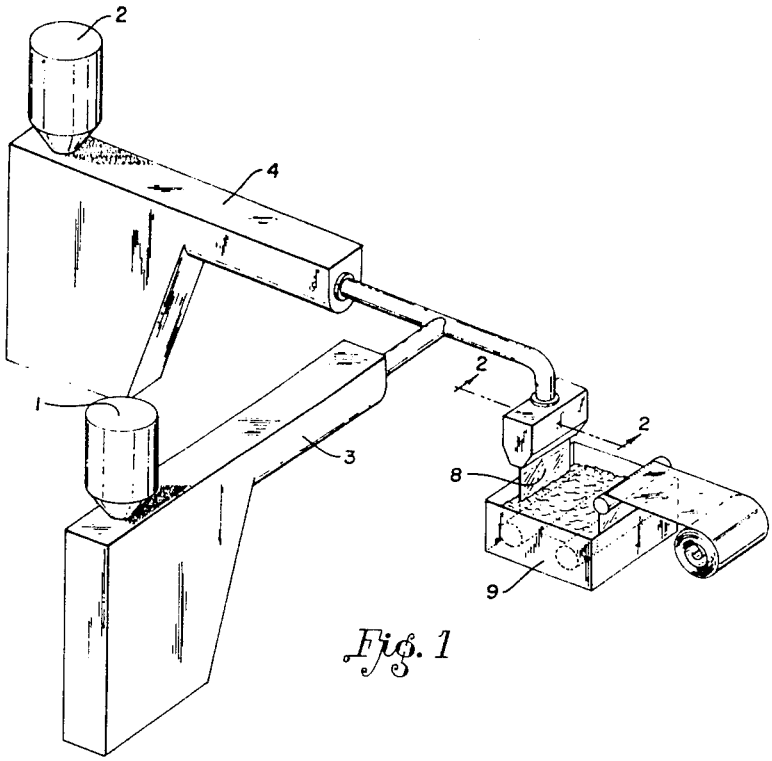
Figure 2:
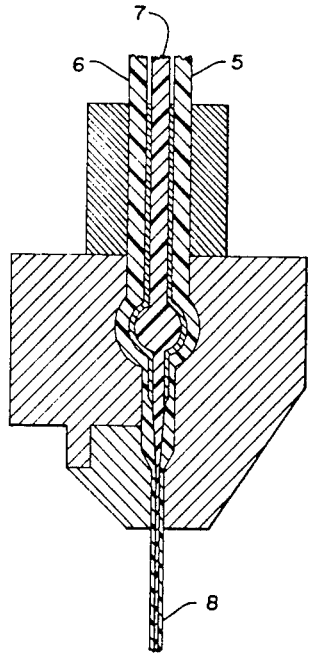
Figure 3:
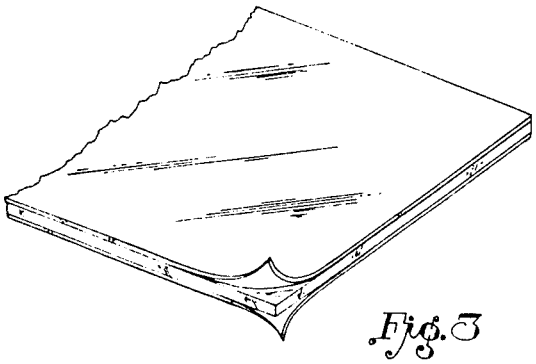

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 3, 1974

929 O.G. 9

T929,002

PROCESS FOR PREPARING EXTRUDED CELLULOSIC FILM AND SHEETING HAVING EXCELLENT OPTICAL PROPERTIES

Max L. Carroll, Jr., 720 Teasel Drive, Apt. 14, Kingsport, Tenn. 37660

Filed July 16, 1973, Ser. No. 379,682
**Int. Cl. B29f *3/10***
U.S. Cl. 260—224
1 Sheet Drawing. 5 Pages Specification

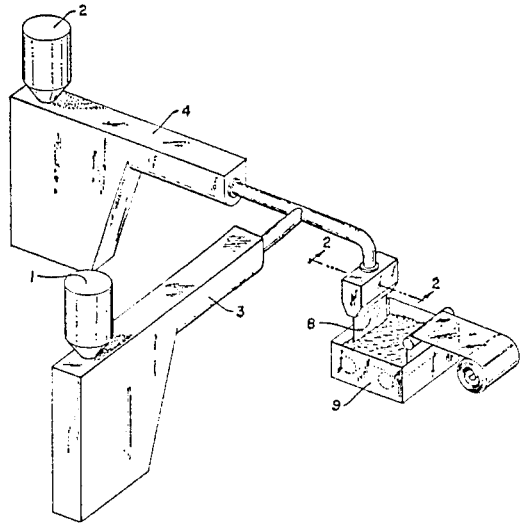

A process is disclosed for preparing extruded cellulosic film and sheeting having excellent clarity and other optical properties which are substantially free of die lines and similar die imperfections. The extruded cellulosic films and sheeting are extruded as a trilaminate with the center layer of the trilaminate being the cellulosic layer. The outer lamina which covers both sides of the cellulosic layer is of a dissimilar and incompatible thermoplastic material such as polyethylene. As the trilaminate flows through the die the outer thermoplastic layers prevent the inner cellulosic layer from contact with the lips of the die. After extrusion, the outer lamina can be stripped from the cellulosic center or inner lamina thereby providing an extruded cellulosic sheet or film free of die marks and which has excellent clarity.

Dec. 3, 1974 M. L. CARROLL, JR T929,002

PROCESS FOR PREPARING EXTRUDED CELLULOSIC FILM AND SHEETING HAVING EXCELLENT OPTICAL PROPERTIES

Filed July 16, 1973